(12) United States Patent
Utt

(10) Patent No.: US 11,001,397 B2
(45) Date of Patent: May 11, 2021

(54) SYSTEM AND METHOD FOR A MODULAR RAMP

(71) Applicant: Larry Utt, Hazel Green, AL (US)

(72) Inventor: Larry Utt, Hazel Green, AL (US)

(*) Notice: Subject to any disclaimer, the term of this patent is extended or adjusted under 35 U.S.C. 154(b) by 5 days.

(21) Appl. No.: 16/570,869

(22) Filed: Sep. 13, 2019

(65) Prior Publication Data

US 2021/0078726 A1 Mar. 18, 2021

(51) Int. Cl.
*B64F 1/04* (2006.01)
*A63C 19/10* (2006.01)
*B63G 11/00* (2006.01)

(52) U.S. Cl.
CPC ............ *B64F 1/04* (2013.01); *A63C 19/10* (2013.01); *B63G 11/00* (2013.01)

(58) Field of Classification Search
CPC ............ B64F 1/04; A63C 19/10; B63G 11/00
USPC .................................................. 14/69.5–71.7
See application file for complete search history.

(56) References Cited

U.S. PATENT DOCUMENTS

| | | | | |
|---|---|---|---|---|
| 4,129,916 A * | 12/1978 | Schlesinger | ............ | A63C 19/10 14/69.5 |
| 4,488,326 A * | 12/1984 | Cherry | .................. | B66F 7/0625 14/69.5 |
| 4,517,698 A * | 5/1985 | Lamp'l | ..................... | B64F 1/32 14/72.5 |
| 4,593,424 A * | 6/1986 | Beck | ................... | B65G 69/2823 14/71.5 |
| 4,649,587 A * | 3/1987 | McFarlane | ............ | E01D 15/127 14/2.4 |
| 4,768,617 A * | 9/1988 | Mason | .................... | B64F 1/315 182/1 |
| 5,253,381 A * | 10/1993 | Rawdon | .................... | B64C 1/22 14/71.5 |
| 5,490,754 A * | 2/1996 | Voelzke | .................. | B60P 1/433 14/71.7 |
| 5,749,615 A * | 5/1998 | Itson | ...................... | A63C 19/10 296/26.03 |
| 5,870,788 A * | 2/1999 | Witkin | ................... | A61G 3/061 14/69.5 |
| 6,386,819 B1 * | 5/2002 | Schultz | ..................... | B60P 1/43 14/71.7 |
| 6,921,339 B1 * | 7/2005 | Martin | ................... | A63C 19/10 14/69.5 |
| 7,225,492 B2 * | 6/2007 | Pratt | ...................... | A63C 19/10 14/69.5 |
| 7,670,096 B2 * | 3/2010 | Leum | ................... | B65G 69/006 414/401 |
| 8,161,589 B1 * | 4/2012 | Heffernan | .......... | B65G 69/2829 14/71.3 |

(Continued)

*Primary Examiner* — Raymond W Addie
(74) *Attorney, Agent, or Firm* — AdamsIP, LLC; Edward B. Garner, III; James H. Adams

(57) ABSTRACT

A modular ramp for creating a ski jump on a modern naval vehicles is provided. Generally, the system allows a user to manipulate a ramp surface in a way that best suits the needs of the user at that time. The system generally comprises a framework, interlinking tracks, and control arm. The control arm manipulates the position of the framework, which in turn manipulates the surface created by the interlinking tracks. The modular ramp may also comprise mechanical joints and a hinge, which may allow the surface to be manipulated in multiple directions.

18 Claims, 5 Drawing Sheets

(56) References Cited

U.S. PATENT DOCUMENTS

| | | | |
|---|---|---|---|
| 8,370,982 B2* | 2/2013 | Peters | E04F 11/1812 14/69.5 |
| 8,869,334 B1* | 10/2014 | Leum | B65G 69/30 14/72.5 |
| 2017/0043240 A1* | 2/2017 | Gee | A63C 19/10 |

* cited by examiner

SYSTEM AND METHOD FOR A MODULAR RAMP

FIELD OF THE DISCLOSURE

The subject matter of the present disclosure refers generally to a system and method for a modular ramp.

BACKGROUND

Modern warships often provide aerial vehicles a runway means from which to take off and land. However, the runway provided is often too short for a normal takeoff. To fix this problem, many modern warships use what is known as a ski-jump. A ski jump is an upward-curved ramp that allows aircraft to take off from a runway that is shorter than the aircraft's required takeoff roll. By forcing the aircraft upwards, lift-off can be achieved at a lower airspeed than that required for sustained flight, while allowing the aircraft to accelerate to such a speed in the air rather than on the runway. Though this type of ramp system allows aircraft to take off on the short runways provided by modern warships, it also reduces the available useable deck space since the curved ramp area is more or less unusable for many tasks. Further, it may be beneficial to have the ability to alter the amount of curvature that the ski jump possess depending on the aerial vehicle taking off, but current ski jump ramps are fixed at a specific curvature that can't be altered.

Accordingly, there is a need in the art for a system of a modular ramp that can provide both usable deck space and a ski jump with varying degrees of curvature.

SUMMARY

A system for a modular ramp is provided. In one aspect, the system of the present disclosure is designed to create a ramp that can be raised and lowered in a way such that the ramp can be flat when lowered and create a ramp with a curved surface when raised. In another aspect, the system of the present disclosure is designed to create a ramp surface that a user may manipulate to their needs. Generally, the system of the present disclosure allows a user to create a surface depending on the needs of the user. The system generally comprises a framework, interlinking tracks, and control arm.

The interlinking tracks are connected to each other in a way such that they form a structure having a ramp surface. The interlinking tracks are connected to the framework. The framework supports the interlinking tracks in a way such that they may be manipulated by the control arm. The control arm may alter the position of the framework, thus changing the shape/incline of the ramp surface. The system may also comprise a locking mechanism, which may be used to lock the control arm in place to secure the shape/incline of the ramp surface. In one preferred embodiment, the system may comprise a tension arm. The tension arm is connected to the framework and/or interlinking tracks in a way that exerts a tension force opposite the extension force exerted by the hydraulic arm. The system may also comprise a mechanical joint, which may allow the system to manipulate the ramp surface shape about both the x and y-axes.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
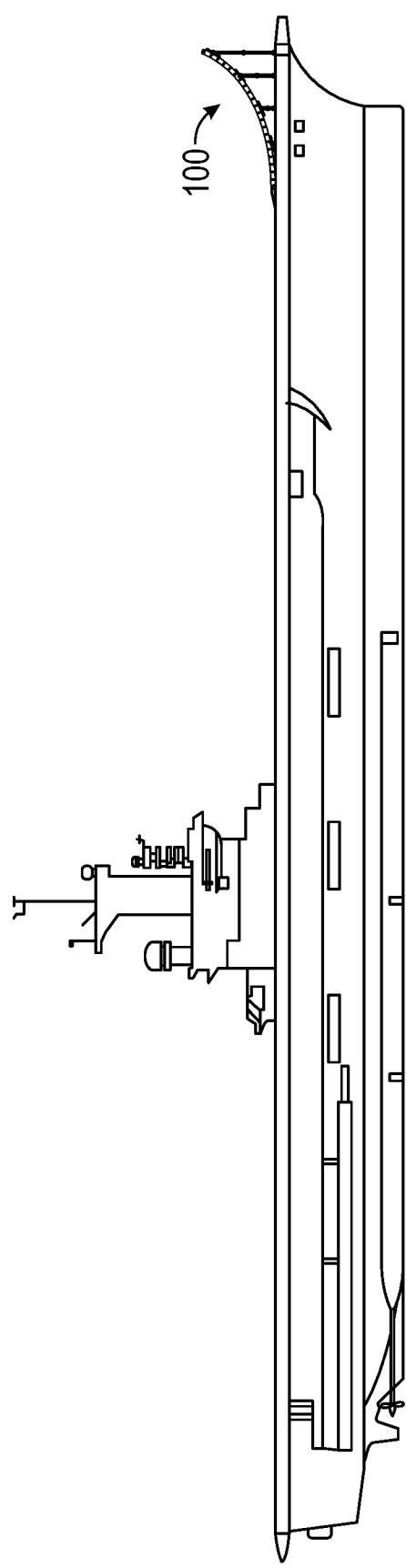
FIG. 1 is a side environmental view of a system in which techniques described herein may be implemented.
Figure 2:
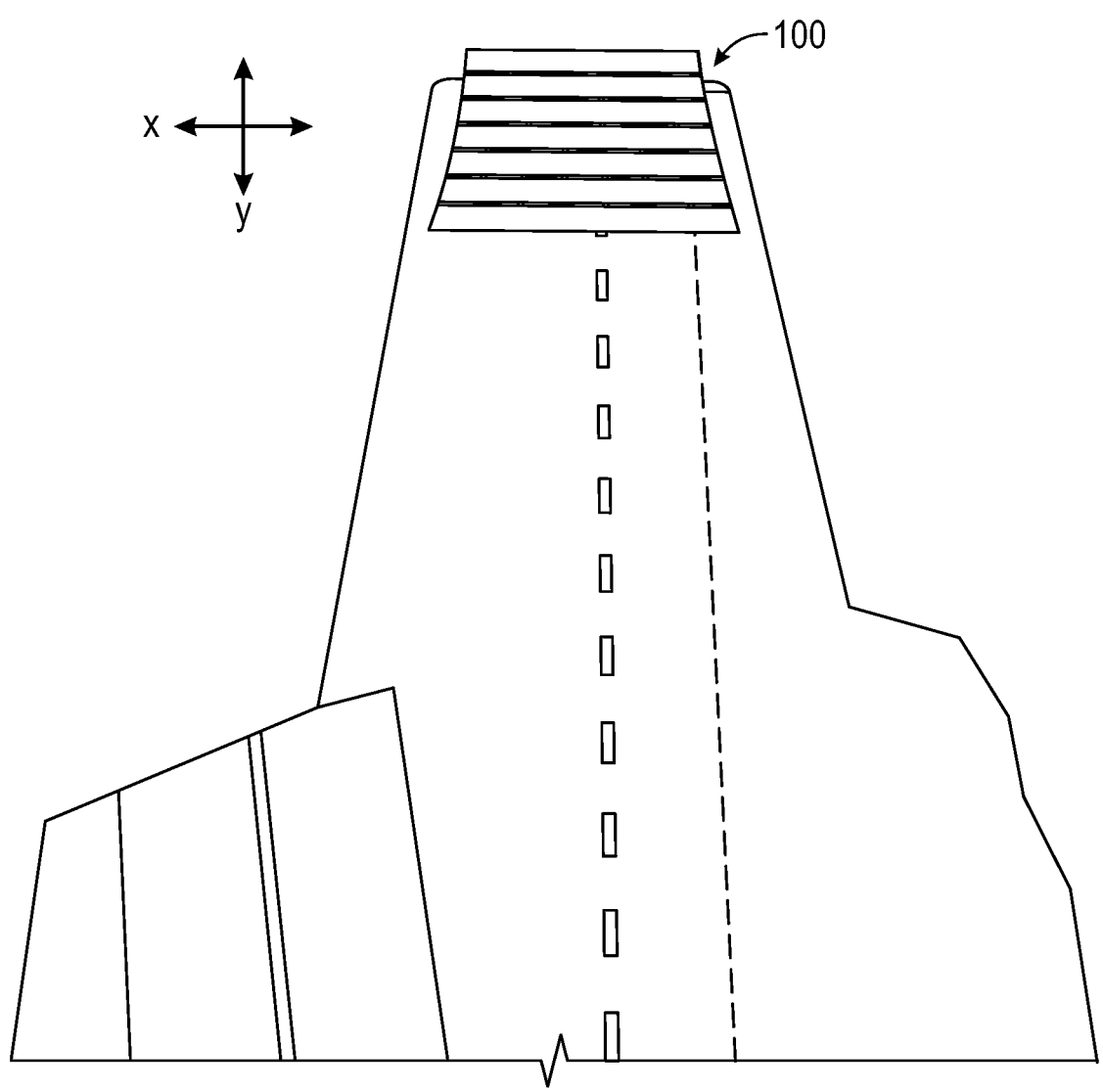
FIG. 2 is a top environmental view of a system in which techniques described herein may be implemented.
Figure 3:
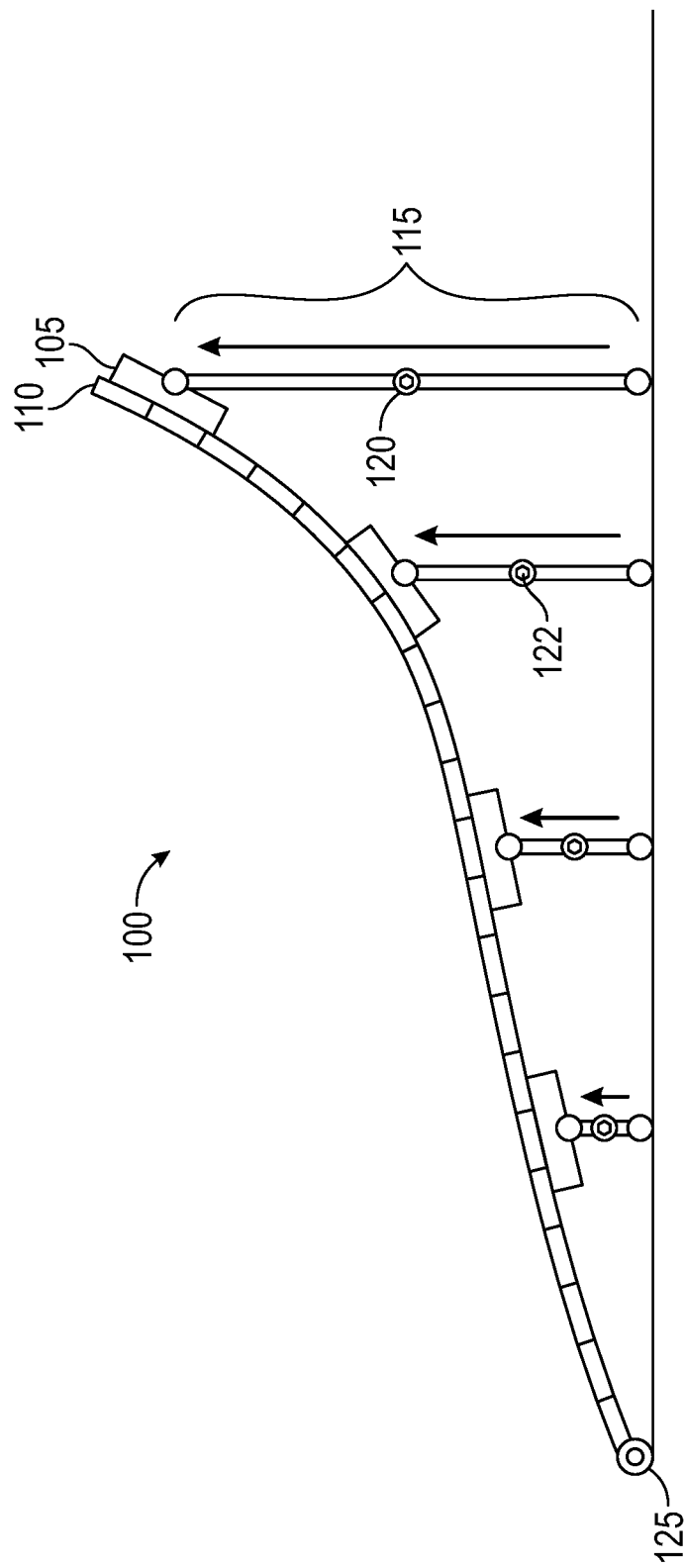
FIG. 3 is a side view of a system in which techniques described herein may be implemented.
Figure 4:
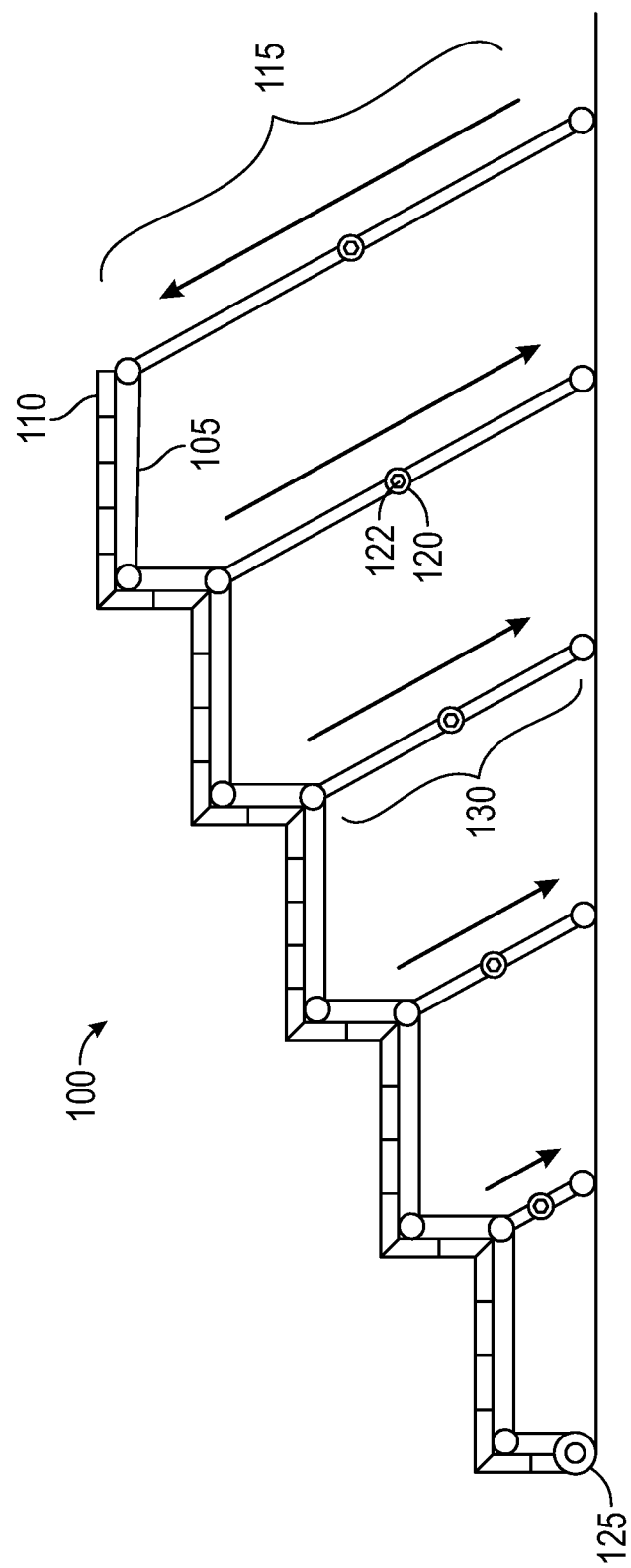
FIG. 4 is a side view of a system in which techniques described herein may be implemented.
Figure 5:
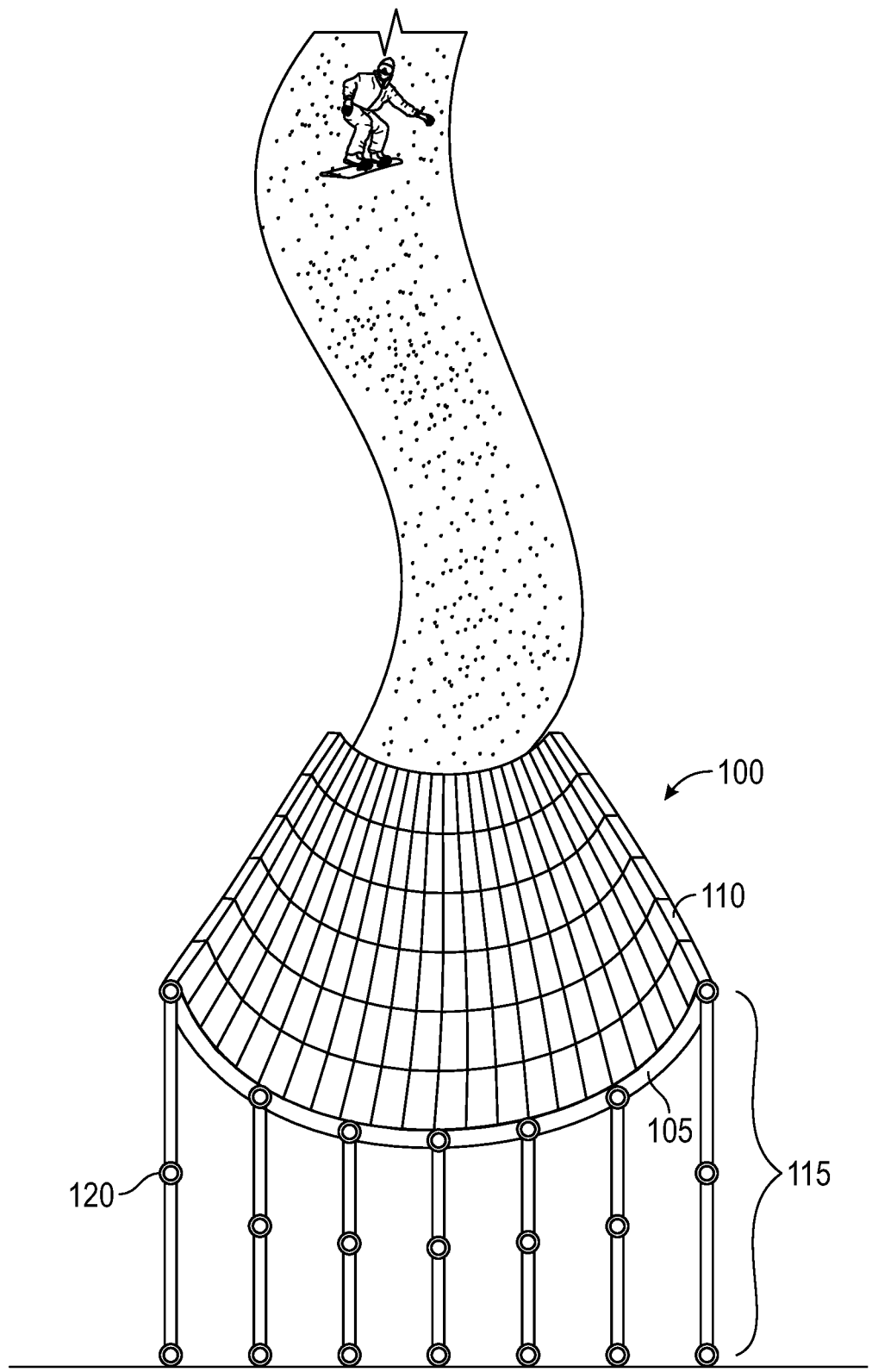
FIG. 5 is a perspective environmental view of a system in which techniques described herein may be implemented.

As will be evident from the disclosure provided, the present invention satisfies the need for a system 100 and method of a modular ramp that can create both a launch ramp and deck space. FIGS. 1-5 illustrate embodiments of a modular ramp system 100. The system 100 generally comprises a framework 105, control arm 115, and interlinking tracks 110. In one preferred embodiment, the system 100 further comprises a tension arm 130 that can be used to manipulate the ramp surface created by the interlinking tracks 110. In yet another preferred embodiment, the system 100 may further comprise a mechanical joints 120 and/or a hinge 125, which may allow the ramp surface created by the interlinking tracks 110 to be manipulated in multiple directions. FIG. 1 illustrates a side view of a system 100 comprising multiple control arms 115 on an aircraft carrier to assist with the launching of aircraft. FIG. 2 illustrates a side view of a system 100 comprising multiple control arms 115 on an aircraft carrier to assist with the launching of aircraft. FIG. 3 illustrates a system 100 comprising control arms 115, mechanical joints 120, and a hinge 125 that work together with the framework 105 and interlocking tracks 110 to create a ski-jump. FIG. 4 illustrates a system 100 comprising control arms 115, mechanical joints 120, hinge 125, and tension arms 130 that work together with the framework 105 and interlocking tracks 110 to create stairs. FIG. 5 illustrates a system 100 comprising control arms 115 and mechanical joints 120 on the framework 105 that work together to create a halfpipe ramp for extreme sports.

The interlinking tracks 110 create the ramp structure that may be manipulated by the various pieces of the system 100. The interlinking tracks 110 are connected to each other in a way such that the ramp structure forms a ramp surface, as illustrated in FIGS. 1-5. In a preferred embodiment, the interlinking tracks 110 are modular chain links. In one preferred embodiment, the structure created by the interlinking tracks 110 creates a surface that is generally rigid about an x-axis and pliable about a y-axis, as illustrated in FIGS. 1 and 2. This may allow the system 100 to manipulate the ramp surface in a way such that it is curved or otherwise irregular about the x-direction. For instance, the system 100 may create a curved ramp surface to allow aircraft to take off from the deck of a ship. For instance, the system 100 may create an irregular ramp surface in the shape of stairs that may then be manipulated by the system 100 in the shape of a flat ramp surface. In another preferred embodiment, the structure created by the interlinking tracks 110 is pliable about both the x-axis and y-axis, as illustrated in FIG. 5. For instance, the system 100 may create a ramp surface having an inclined half-pipe shape, which may be used for extreme sports. For instance, the system 100 may create a ramp surface that is curved about the x-axis on only one side of the ramp and linear about the y-axis to create a quarter-pipe shape.

In a preferred embodiment, the interlinking tracks 110 are connected to the framework 105. The framework 105 supports the interlinking tracks 110 in a way such that they may be manipulated by the control arm 115. In one preferred embodiment, the framework 105 is one large piece that may support the entire structure created by the interlinking tracks 110. In another preferred embodiment, the framework 105 may comprise multiple framework units 105 that may be added or subtracted depending on system 100 design. For instance, the system 100 may comprise a first framework unit 105 and a second framework unit 105, wherein the ramp surface created by the interlocking tracks 110 attached to said first framework unit 105 and said second framework unit 105 may be manipulated by a position of said first framework unit 105 relative to said second framework unit 105. For instance, the system 100 may comprise a top framework unit 105, bottom framework unit 105, and additional framework unit 105 wherein control arms 115 attached to said top framework unit 105 and additional framework unit 105 may manipulate the ramp surface depending on their position relative to said bottom framework unit 105. In a preferred embodiment, the framework 105 comprises a material having a low fatigue limit, which may prevent the system 100 from weakening over continued stress cycles. This low fatigue limit is important for applications the system 100 may be used to assist aircraft launching from marine vehicles. However, one with skill in the art may recognize that the framework 105 may comprise of any material that can support a ramp as described herein.

The control arm 115 alters a position of said framework 105, thus changing the shape/incline of the ramp surface. In a preferred embodiment, the control arm 115 is operably connected to the framework 105 in a way such that one side of the framework 105 may be raised or lowered. For instance, a system 100 having a framework 105 with a first end connected to a hinge 125 and a second end connected to said control arm 115 may allow a user to manipulate the control arm 115 in a way such that the second end may be moved from a first position to a second position, wherein the ramp surface has zero incline in said first position and has an incline in said second position. In another preferred embodiment, more than one control arm 115 may be connected to the system 100 in a way that allows a user alter one or more framework units 105 of the system 100. For instance, a system 100 comprising a first framework 105 and second framework 105 may have a control arm 115 attached to each of said first framework 105 and said second frame. A user may then alter the position of said first framework 105 and said second framework 105 in a way such that the entire ramp surface may be raised or lowered without changing the incline of the ramp surface. For instance, a system 100 comprising a top framework unit 105, bottom framework unit 105, and multiple middle framework units 105 may have a control arm 115 attached to each unit in a way such that a user may position the framework units 105 in a way that creates stairs. Therefore, the system 100 may have control arms 115 that may position the framework units 105 in different positions, allowing a user to create unique ramp surfaces depending on the circumstances.

In a preferred embodiment, as illustrated in FIGS. 1, and 2, the control arms 115 are hydraulic devices. In a preferred embodiment, the hydraulic device may comprise a hydraulic pump, hydraulic fluid, hydraulic reservoir, control valves, a user control, an actuator connected to the hydraulic pump via a plurality of tubes, and a plurality of seals. The hydraulic pump supplies the hydraulic fluid to the various components of the hydraulic device. The control valves direct the hydraulic fluid to various locations of the hydraulic device via the plurality of tubes. In a preferred embodiment, a computing device is operably connected to the control valves in a way such that a user may operate the computing device in a way that instructs the control valve which route through the plurality of tubes the hydraulic fluid may take to the actuator. The actuator is responsible for moving objects using the work force generated by the pressure changes caused by the hydraulic fluid. The hydraulic reservoir holds hydraulic fluid not currently being used to operate the hydraulic device. The plurality of seals prevents the escape of hydraulic fluid from the hydraulic device.

In a preferred embodiment, the actuator comprises a hydraulic cylinder defined by an internal cavity, a slidably moveable piston disposed within the internal cavity, and a strut operably connected to the slidably moveable piston. The slidably moveable piston may be shaped in a way such that it creates two chambers within the cavity. In a preferred embodiment, the hydraulic cylinder may be operably connected to the linear actuator in a way such that the direction of rotation of the pinion manipulates the control valve so that it directs hydraulic fluid pumped by the hydraulic pump into one of a first chamber or a second chamber of the hydraulic cylinder. Pressure change resulting from hydraulic fluid being injected into the first chamber or second chamber acts on the slidably moveable piston, causing the slidably moveable piston to move in a direction from higher pressure to lower pressure. The strut is projected out the strut end of the hydraulic device and is coupled to the frame. Operating the hydraulic device to cause the slidably moveable piston to move in a direction from higher pressure to lower pressure causes the strut to move in a linear direction, which in turn causes the framework 105 to change position.

In another preferred embodiment, the control arm 115 is a hydraulic arm. The hydraulic arm comprises a folding arm and a hydraulic device. The folding arm comprises a plurality of arm units and a plurality of mechanical joints 120. The hydraulic device is operably connected to the folding arm in a way such that it may extend or fold the arm units. Therefore, the folding arm may change the position of the framework 105 depending on the amount of force exerted on the foldable arm by the hydraulic device and the angle in which the force is exerted. For instance, a system 100 comprising a hydraulic arm having a top arm unit and bottom arm unit connected by a mechanical joints 120 may be extended from a folded position to a linear position by extending the strut of the hydraulic device, thus raising the framework unit 105 to which the hydraulic arm is attached. For instance, a system 100 comprising a plurality of hydraulic arms may generally have a ramp surface with no incline when the struts of the hydraulic devices are fully retracted and possess a gradually increasing incline about the x-axis when the struts of the hydraulic devices are extended at varying degrees.

The system 100 may also comprise a locking mechanism, wherein said locking mechanism may be used to lock the control arm 115 in place, thus securing the position of the framework 105 and shape/incline of the ramp surface. For instance, a system 100 having a control arm 115 extended in a way that increases the incline of the ramp surface may be locked via said locking mechanism to prevent a loss or further increase in the incline. In one preferred embodiment, the locking mechanism is a mechanical fastener. A mechanical fastener may include, but is not limited to, rivets, screws, nails, bolts, or any combination thereof. In another preferred embodiment, the hydraulic device may lock the control arm 115 in a desired position, which in turn locks the ramp surface created by the interlinking tracks 110. In yet another preferred embodiment, an electronic lock may be used to lock the control arm 115 of the system 100 in place. An electric current sent by the user via a computing device or switch may activate/deactivate the electronic lock. For instance, a user may manually choose to deactivate an electronic lock operably connected to control arm 115 using switch, wherein the switch sends an electronic signal to the electronic lock instructing it to deactivate, thus causing the control arm 115 to be unlocked so that it may be repositioned.

In one preferred embodiment, as illustrated in FIG. 4, the system 100 may comprise a tension arm 130. The tension arm 130 is connected to the interlinking tracks 110 in a way that exerts a tension force opposite the extension force exerted on the framework 105 by the control arm 115. In one embodiment of a system 100 comprising a tension arm 130, the tension arm 130 is connected to the interlinking tracks 110. As the control arm 115 changes the position of the frame, the tension arm 130 may pull on the plurality of interlinking tracks 110 and change the shape of the ramp surface. For instance, a system 100 having a tension arm 130 may be configured in a way such that the tension arms 130 of the system 100 pull on the interlinking tracks 110 as the control arm 115 raises the frame, thus causing the ramp surface to take on a curved shape. In another embodiment of a system 100 comprising a tension arm 130, the tension arm 130 is connected to the frame. For instance, a system 100 comprising a top framework unit 105 connected to a control arm 115, and bottom framework unit 105 connected to a hinge 125, and a middle framework unit 105 connected to a control arm 115 may take on the shape of stairs as the top end is moved from a first position to a second position. This same system 100 may then take on the shape of an inclined ramp by using the control arm 115 to move the top framework unit 105 from the second position to a third position. In another preferred embodiment, the control arm 115 may further comprise a mechanical joints 120.

The mechanical joints 120 of the system 100 allow the control arms 115 and tension arms 130 of the system 100 to fold and extend at various angles. In one preferred embodiment, the framework 105 also comprises a plurality of mechanical joints 120, thus allowing the system 100 to alter the shape of the frame. This may provide more structural stability to ramp surface shapes created by the system 100 that would otherwise be supported by only the interlinking tracks 110. The mechanical joints 120 also allow for a system 100 to alter the shape of the ramp surface in both the x-direction and y-direction. For instance, a system 100 comprising a single framework 105 connected to multiple control arms 115 and having a mechanical joints 120 may change the shape of the ramp surface by altering the positions of the framework 105 using said control arms 115, wherein the framework 105 provides more structural support to the ramp surface shape For instance, as illustrated in FIG. 3, a system 100 may comprise a top framework unit 105, bottom framework unit 105, and middle framework units 105, wherein the framework units 105 run about the x-axis and further comprise a plurality mechanical joints 120. Control arms 115 of the system 100 may be attached to the framework units 105 at multiple points so that the interlinking tracks 110 attached to the framework units 105 may be manipulated in both the x and y directions to create a desired ramp surface.

The system 100 may also comprise a hinge 125. In a preferred embodiment, the framework 105 is connected to said hinge 125 in a way that allows the framework 105 to move about said hinge 125. For instance, a system 100 having a first framework unit 105 attached to a hinge 125 and a second framework unit 105 attached to a control arm 115 may move about said hinge 125 as said first framework unit 105 is moved from a first position to a second position. The hinge 125 preferably is attached to one end of the frame, which may secure the framework 105 in a single place. Thus, a user may then manipulate the system 100 relative to the portion of the framework 105 attached to the hinge 125.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter can be made without departing from the principles and scope of the inventive subject matter.

What is claimed is:

1. A system comprising,
an adaptable framework,
a control arm operably connected to said adaptable framework and having at least one mechanical joint,
wherein said control arm alters a position of said adaptable framework,
wherein said at least one mechanical joint is located between a first end and second end of said control arm, and
wherein said at least one mechanical joint allows said control arm to fold and extend,
interlinking tracks connected to said adaptable framework,
wherein said interlinking tracks form a ramp surface, and
wherein a shape of said ramp surface is manipulated by said position of said adaptable framework.

2. The system of claim 1, further comprising a locking mechanism,
wherein said locking mechanism secures said adaptable framework in said position.

3. The system of claim 1, further comprising a hinge connecting said adaptable framework to said control arm,
wherein said adaptable framework moves about said hinge.

4. The system of claim 1,
wherein said adaptable framework further comprises said at least one mechanical joint.

5. The system of claim 1, further comprising a tension arm,
wherein said tension arm is connected to at least one of said adaptable framework and said interlinking tracks,
wherein said tension arm exerts a tension force that opposes an extension force exerted by said control arm.

6. The system of claim 1, wherein said control arm is a hydraulic device.

7. The system of claim 1, wherein said interlinking tracks are modular chain links.

8. The system of claim 1, wherein said locking mechanism is a mechanical fastener.

9. A system comprising,
a first framework,
a second framework,
a control arm operably connected to said first framework and having at least one mechanical joint,
wherein said control arm alters a position of said first framework,
wherein said at least one mechanical joint is located between a first end and second end of said control arm,
wherein said at least one mechanical joint allows said control arm to fold and extend,
interlinking tracks connected to said first framework and said second framework,
wherein said interlinking tracks form a ramp surface,
wherein a shape of said ramp surface is manipulated by said position of said first framework relative to said second framework, and
a tension arm,
wherein said tension arm is connected to said interlinking tracks,
wherein said tension arm exerts a tension force that opposes an extension force exerted by said control arm.

10. The system of claim 9, further comprising a locking mechanism,
wherein said locking mechanism secures said first framework in said position relative to said second framework.

11. The system of claim 9, further comprising a hinge connecting said first framework and said second framework to said control arm, wherein said first framework and said second framework move about said hinge.

12. The system of claim 9,
wherein said first framework, second framework, and tension arm further comprise said at least one mechanical joint.

13. The system of claim 9, further comprising an additional framework between said first framework and said second framework,
wherein said interlinking tracks are connected to said additional framework,
wherein said control arm is operably connected to said additional framework, and
wherein said additional framework further comprises said at least one mechanical joint.

14. A system comprising,
a plurality of framework units,
a plurality of control arms having at least one mechanical joint,
wherein said plurality of control arms is connected to said plurality of framework units,
wherein each control arm of said plurality of control arms connected to each respective framework unit of said plurality of framework units alters a position of said plurality of framework units in respect to one another,
wherein said plurality of control arms provide an upward force when acting on said plurality of framework units,
wherein said control arm of said plurality of control arms comprises a hydraulic device,
wherein said at least one mechanical joint is located between a first end and second end of said control arm,
interlinking tracks connected to said plurality of framework units,
wherein said interlinking tracks form a ramp surface on top of said plurality of framework units,
wherein a shape of said ramp surface is manipulated by said position of said plurality of framework units as said position of said plurality of framework units is altered in respect to one another, and
wherein a range of motion of said control arm of said plurality of control arms is limited by said position of a neighboring control arm due to said ramp surface being connected to said plurality framework units.

15. The system of claim 14, further comprising at least one tension arm,
wherein said at least one tension arm is operably connected to at least one of said interlinking tracks and said plurality of framework units,
wherein said at least one tension arm exerts a tension force on said interlinking tracks that opposes said extension force exerted on said interlinking tracks by said plurality of control arms.

16. The system of claim 15, wherein said plurality of framework units and said at least one tension arm further comprise said at least one mechanical joint.

17. The system of claim 14, further comprising a hinge connecting said control arm of said plurality of control arms to said respective framework unit of said plurality of framework units, wherein said respective framework unit moves about said hinge.

18. The system of claim 14, further comprising a locking mechanism,
  wherein said locking mechanism secures said respective framework unit in said position relative to said plurality of framework units.

* * * * *